United States Patent [19]

Leatherman

[11] 4,181,626

[45] Jan. 1, 1980

[54] METHOD OF PREPARING TUNGSTEN HEXACARBONYL CONTAINING POLYMERS AND POLYMERS PREPARED THEREBY

[75] Inventor: Ivan R. Leatherman, Wadsworth, Ohio

[73] Assignee: PPG Industries, Inc., Pittsburgh, Pa.

[21] Appl. No.: 864,355

[22] Filed: Dec. 27, 1977

[51] Int. Cl.$^2$ .......................... F21V 9/04; F21V 9/12
[52] U.S. Cl. .................... 252/300; 260/42.21; 260/429 R; 350/1.4; 350/1.5; 350/311; 350/312
[58] Field of Search .................. 252/300; 350/1.4, 1.5, 350/311, 312; 260/42.21, 429 R

[56] References Cited

U.S. PATENT DOCUMENTS

| | | | |
|---|---|---|---|
| 1,894,239 | 1/1933 | Naumann et al. | 423/53 |
| 1,921,536 | 8/1933 | Naumann | 423/53 |
| 2,370,567 | 2/1945 | Muskat et al. | 526/9 |
| 2,403,113 | 7/1946 | Muskat et al. | 260/463 |
| 3,222,432 | 12/1965 | Grandperret | 264/1 |
| 3,560,254 | 2/1971 | Seddon | 427/302 |
| 3,692,688 | 9/1972 | Castellion et al. | 252/300 |
| 4,069,168 | 1/1978 | Leatherman et al. | 252/300 |

OTHER PUBLICATIONS

Massey, A. G., et al., "A Reversible Photochromic Polymer", *Nature*, vol. 191, No. 4796, Sep. 30, 1961, p. 1387.
El-Sayed, M. A., "A New Class of Photochromic Substances: Metal Carbonyls", *J. Phys. Chem.*, vol. 68, p. 433 (1964).

*Primary Examiner*—Benjamin R. Padgett
*Assistant Examiner*—Deborah L. Kyle
*Attorney, Agent, or Firm*—Richard M. Goldman

[57] ABSTRACT

Disclosed are light absorbing solutions of tungsten hexacarbonyl in olefinically unsaturated carboxylic acids and light absorbing polymers prepared from allyl carbonate, olefinically unsaturated acid monomers, and tungsten hexacarbonyl. Also disclosed is a process for preparing such light absorbing polymers.

24 Claims, No Drawings

METHOD OF PREPARING TUNGSTEN HEXACARBONYL CONTAINING POLYMERS AND POLYMERS PREPARED THEREBY

BACKGROUND OF THE INVENTION

This invention relates to light absorbing compositions including liquids and polymerizates thereof having a good near infrared absorption and to methods for making them. By "near infrared" is meant that portion of the electromagnetic spectrum having a wave length of from about 700 to about 2,000 nanometers.

High quality optical lenses are widely made by polymerizing diglycol allyl carbonate, e.g., diethylene glycol bis(allyl carbonate), or mixtures thereof with minor proportions of other monomers such as methyl methacrylate and vinyl acetate in molds. Tinted lenses are generally made by dip-dyeing in heated solutions of a variety of organic dyes. However, most such lenses, whether tinted or colorless, transmit near infrared freely.

U.S. Pat. No. 3,692,688 discloses essentially haze-free optical filters of polymethylmethacrylate containing an in situ reaction product of tungsten hexachloride and stannous chloride which is said to filter near infrared radiation efficiently while retaining considerable transmittance of light in the visible region. It is there stated that the magnitude of the mole ratio of stannous chloride tungsten hexachloride is as important a factor as the concentration of the tungsten hexachloride in affecting the filtering efficiency.

It has been reported by El-Sayed in the *Journal of Physical Chemistry*, Vol. 68, pp. 433–434, (1964), that tungsten hexacarbonyl is photochromic when dissolved in certain solvents. However, the compound reportedly displayed a color shift to yellow, which is not a desirable color for sunglasses.

Commonly assigned, co-pending U.S. application Ser. No. 728,561 filed Oct. 1, 1976, now U.S. Pat. No. 4,069,168, for TUNGSTEN HEXACARBONYL IN PLASTIC LENSES describes a method of preparing photochromic articles by polymerizing a diglycol bis(allyl carbonate) in the presence of tungsten hexacarbonyl. As there disclosed, the monomer may contain up to about 1.0 weight percent tungsten hexacarbonyl, although when more than 0.1 weight percent tungsten hexacarbonyl is present in the monomer, a polymer containing bubbles is obtained. However, as there disclosed, the tendency to bubble formation may be reduced by exposing the mixture of glycol bis(allyl carbonate) and tungsten hexacarbonyl to ultraviolet radiation and thereafter degassing the mixture.

It has now been found that the step of exposing the mixture of glycol bis(allyl carbonate) and tungsten hexacarbonyl to ultraviolet radiation and thereafter degassing the mixture may be dispensed with if the tungsten hexacarbonyl is first added to an olefinically unsaturated carboxylic acid and if the resulting composition is thereafter added to the glycol bis(allyl carbonate).

It has further been found that higher concentrations of tungsten hexacarbonyl may be provided in the glycol bis(allyl carbonate), e.g., high enough to provide a permanent coloration to the polymerizate rather than a photochromic tint, by first incorporating the tungsten hexacarbonyl in an olefinically unsaturated carboxylic acid and thereafter adding the resulting composition to the glycol bis(allyl carbonate). The composition of the olefinically unsaturated carboxylic acid and tungsten hexacarbonyl may be either a liquid or a solid.

DESCRIPTION OF THE INVENTION

It has now been found that tungsten hexacarbonyl, $W(CO)_6$, may be incorporated in liquid allyl gylcol carbonates and solid poly(allyl glycol carbonate) in high concentrations whereby to produce light absorbing liquids and lenses, sheets, or other shapes which are optically clear and substantially haze-free, are permanently light absorbing, have substantial near infrared absorbance, and have a reasonable service life. By "permanently light absorbing" is meant the substantial absence of a return to a water-white condition when shielded from ultraviolet radiation. By "substantial infrared absorbance" is meant absorbance in the near infrared region at least as great as the average absorbance in the visible region.

In accordance with the practice of this invention, tungsten hexacarbonyl may be dissolved or dispersed uniformly in an olefinically unsaturated carboxylic acid, e.g., a monocarboxylic acid as acrylic acid or a dicarboxylic acid as maleic acid or maleic acid anhydride, to provide a composition which may then be polymerized with a bis(allyl carbonate), e.g., diethylene glycol bis(allyl carbonate), in known ways to produce light absorbing, colored polymerizates having substantial near infrared absorbance.

Solutions of tungsten hexacarbonyl in olefinically unsaturated carboxylic acid monomers are colorless to blue in color and, when protected from prolonged exposure to high temperatures, are sufficiently stable to be shipped and stored. Such compositions may be made up and shipped to a lens maker who may add them to bis(allyl carbonate) monomer in a lens fabricating process. According to an alternative exemplification, a solution of tungsten hexacarbonyl in an olefinically unsaturated carboxylic acid monomer may be made up as described hereinbelow and added to bis(allyl carbonate) and thereafter shipped to a lens maker for use in a lens making process. According to a still further exemplification of the method of this invention, a solution of tungsten hexacarbonyl in an olefinically unsaturated carboxylic acid monomer may be made up as described hereinbelow and added to bis(allyl carbonate). A suitable dye, for example, CIBA-Geigy IRGASET yellow, may be added to the liquid composition in order to obtain a green polymerizate. Thereafter, the resulting liquid composition of the tungsten hexacarbonyl, the olefinically unsaturated carboxylic acid monomer, the bis(allyl carbonate) monomer, and the dye, may be shipped to a lens maker for use in a lens making process.

Tungsten hexacarbonyl is a known compound. Methods of preparation appear in the literature. See, for example, U.S. Patents 1,894,239 and 1,921,536.

Bis(allyl carbonate) monomers which may be used in the practice of this invention are normally liquid allyl carbonates, i.e., glycol bis (allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, or alkylene polyether group having from 2 to 10 carbons and oxygens. These bis(allyl carbonate) monomers are represented by the formula:

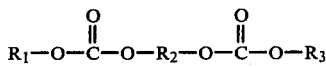

where $R_1$ and $R_3$ are allyl groups and $R_2$ is a radical derived from the glycol used to make the bis (allyl carbonate) monomer. $R_1$ and $R_3$ are represented by the formula:

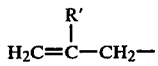

where R' may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. Nos. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2CH_2-$, and $-CH_2CH_2CH_2-O-CH_2CH_2CH_2-$, and alkylene polyether groups such as $-CH_2CH_2-O-CH_2CH_2-O-CH_2CH_2-$ and $-CH_2-O-CH_2CH_2-O-CH_2-$ groups. Most commonly, $R_2$ is $-CH_2CH_2-$ or $-CH_2CH_2-O-CH_2CH_2-$.

Specific examples of bis(allyl carbonate) monomers include ethylene glycol bis(2-chloroallyl carbonate), diethylene glycol bis(2-methallyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), and pentamethylene glycol bis(allyl carbonate).

Most commonly the bis(allyl carbonate) monomer moiety is:

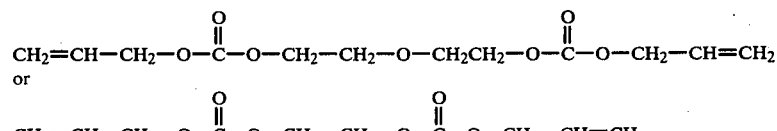

It is believed that all of the above-described bis(allyl carbonates) are useful in the practice of this invention because of their similarity to diethylene glycol bis(allyl carbonate),

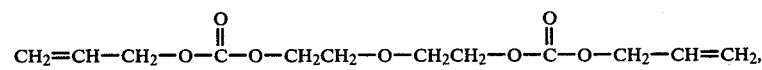

which has been tested and found useful. Diethylene glycol bis(allyl carbonate) is the preferred monomer for use in the practice of this invention.

Olefinically unsaturated carboxylic acid monomers which may be used in the practice of this invention are normally liquids with either $\alpha$-$\beta$ unsaturation or $\beta$-$\Gamma$ unsaturation. The acids with $\alpha$-$\beta$ unsaturation may be monocarboxylic or dicarboxylic and are represented by the formula:

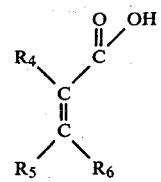

where $R_4$, $R_5$, and $R_6$ may be hydrogen, a halogen, or an alkyl group of 1 to 4 carbon atoms, and either $R_5$ or $R_6$, but not both of them, may be a carboxylic acid group. When $R_6$ is a carboxylic acid group, i.e., when the olefinically unsaturated carboxylic acid is a cis-dicarboxylic acid, the acid may be utilized either as the acid or as the acid anhydride represented by the formula:

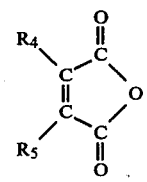

where $R_4$ and $R_5$ are as defined above.

Specific examples of the $\alpha$-$\beta$ olefinically unsaturated carboxylic acids herein contemplated include monocarboxylic acids such as acrylic acid having the formula:

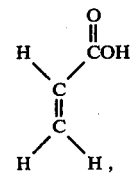

methacrylic acid having the formula:

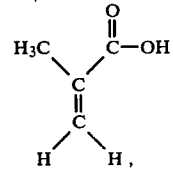

trans-2-butenoic acid, also known as crotonic acid, and having the formula:

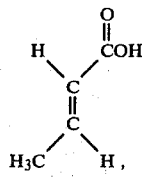

the two α-methyl crotonic acids, angelic acid,

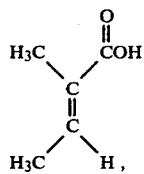

and tiglic acid,

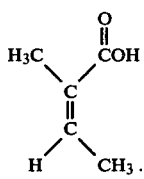

The preferred monocarboxylic acid is acrylic acid.

Specific examples of α-β olefinically unsaturated carboxylic acids herein contemplated also include dicarboxylic acids and, in the case of cis-isomers, their acid anhydride forms. Such olefinically unsaturated dicarboxylic acids include the butenedioic acids such as butenedioic acid, methyl butenedioic acid, dimethyl butenedioic acid, itaconic acid, and acontic acid, including both the cis-isomers and the trans-isomers.

Thus, butenedioic acid may either be trans-butenedioic acid,

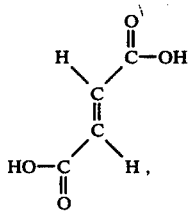

cis-butenedioic acid, i.e., maleic acid,

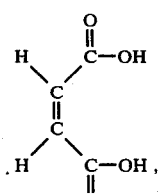

or cis-butenedioic acid anhydride, i.e., maleic anhydride,

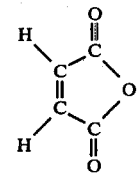

Methyl butenedioic acid may either be utilized in the method of this invention as trans-methyl butenedioic acid,

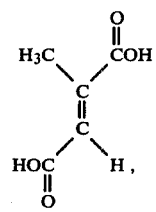

or cis-methyl butenedioic acid, i.e., citraconic acid,

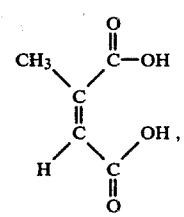

or cis-methyl butenedioic acid anhydride, i.e., citraconic acid anhydride,

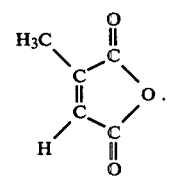

When the dicarboxylic acid is dimethyl butenedioic acid, the acid may be utilized in carrying out the method of this invention as trans-dimethyl butenedioic acid,

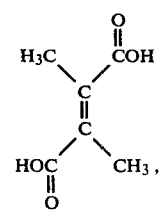

cis-dimethyl butenedioic acid,

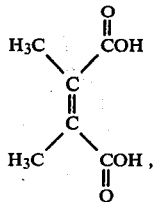

or cis-dimethyl butenedioic acid anhydride,

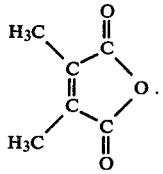

The preferred dicarboxylic acid having α-β unsaturation is maleic acid and its anhydride form, maleic acid anhydride.

The minimum amount of tungsten hexacarbonyl required to provide a permanent light absorbing coloration to the polymerizate when the tungsten hexacarbonyl has reacted with the acid prior to polymerization is generally above about 0.01 weight percent calculated as tungsten hexacarbonyl, basis total organics. Preferably, the amount of tungsten hexacarbonyl in the polymerizate is in excess of about 0.25 weight percent, calculated as described above, and up to the solubility limit of the tungsten hexacarbonyl in the acid, i.e., about 10 weight percent of the acid, when the acid moiety is present in the polymerizate at up to about 25 weight percent of the total polymer. This is generally a tungsten content of about 2 to 3 weight percent tungsten hexacarbonyl, calculated as tungsten hexacarbonyl, basis total organics. Preferably, the concentration of tungsten hexacarbonyl in the polymerizate is from about 0.25 weight percent to about 1.0 weight percent, calculated as described above.

As herein contemplated, the tungsten hexacarbonyl is added to the acid in an amount up to the solubility limit of tungsten hexacarbonyl in the acid, i.e., up to about 10 weight percent tungsten hexacarbonyl, basis weight of the acid. In the case of maleic anhydride, amounts of tungsten hexacarbonyl greater than about 10 weight percent do not go into solution but remain as insoluble, solid particles. A 10 weight percent solution of tungsten hexacarbonyl in the unsaturated acid provides a polymerizate having less than about 2 to 3 weight percent tungsten hexacarbonyl.

The tungsten hexacarbonyl is added to the unsaturated acid, e.g., maleic acid, maleic acid anhydride, or acrylic acid. The composition of the unsaturated acid and the tungsten hexacarbonyl is then heated whereby to provide a color change. The composition is heated to above 95° C. and, if necessary, to between about 150° C. and the boiling point of the liquid composition whereby to cause the liquid composition to become blue. The more severe the heating, that is, the longer that the composition is maintained at any given temperature and the higher the temperature for any given period of heating, the greater will be the degree of light absorbancy of the polymerizate produced thereby.

After the liquid composition of tungsten hexacarbonyl in the unsaturated acid has been heated to provide a blue colored liquid composition, the liquid composition may be filtered. The filtration serves to remove any undissolved tungsten hexacarbonyl.

After filtration, if any, the tungsten hexacarbonyl-unsaturated acid composition is added to the bis(allyl carbonate) whereby to form a reaction medium of acid, bis(allyl carbonate), and the tungsten compound.

The acid, i.e., the light absorbing, colored, normally blue liquid obtained by heating the liquid olefinically unsaturated carboxylic acid in the presence of tungsten hexacarbonyl at a temperature and for a time sufficient to obtain the blue liquid, e.g., at a temperature above about 95° C. for more than about 15 minutes, is added to the bis(allyl carbonate) in an amount sufficient to provide an acid content of up to about 25 weight percent and a tungsten content, calculated as tungsten hexacarbonyl, of from about 0.10 weight to about 3 weight percent, basis total organics, and preferably from about 0.25 weight percent to about 2 weight percent.

Additionally, in order to obtain an aesthetically pleasing polymerizate, for example, a green polymerizate, a small amount of yellow dye as an internal colorant may be added to the reaction medium. For example, from about 0.001 to about 0.01 weight percent of yellow dye provides a pleasing green clear polymerizate. One yellow dye useful in providing a green polymerizate is CIBA-Geigy IRGASET yellow.

Mixtures of bis(allyl carbonate) monomers and olefinically unsaturated carboxylic acid monomers containing tungsten hexacarbonyl, including tungsten hexacarbonyl reaction products, may be polymerized in the presence of heat, radiation, or catalysts such as organic peroxides, for example, diisopropyl peroxydicarbonate, di-sec-butyl peroxy dicarbonate, lauroyl peroxide, and benzoyl peroxide, to yield photochromic polymerizates having a wide range of physical properties such as hardness, abrasion resistance, and impact resistance. Other monomers, such as vinyl acetate and methyl methacrylate, may be included in minor proportions, up to a total of about 25 weight percent, in order to obtain terpolymers having desired physical properties. Such terpolymers having at least about 75 weight percent of the described allyl glycol carbonate units are also believed to be useful in the practice of this invention, but it is preferred to use only the bis(allyl carbonates), particularly diethylene glycol bis (allyl carbonate), in combination with the tungsten hexacarbonyl and the olefinically unsaturated carboxylic acids, particularly maleic acid anhydride or acrylic acid.

The addition of tungsten hexacarbonyl and an olefinically unsaturated carboxylic acid monomer to bis(allyl carbonate) monomer requires little, if any, modification in the methods ordinarily used to effect polymerization to such bis(allyl carbonate) monomers. High concentrations of tungsten hexacarbonyl, e.g., above about 0.3 weight percent, or more may retard cure; but an increase in the concentration of polymerization catalyst, higher temperature, or a longer cure time may be used to reduce this effect. At concentrations up to about 0.1 percent, there is little, if any, retardation of cure. Thus, any known method of polymerizing these monomers may be used to polymerize the monomers having tungsten hexacarbonyl dissolved therein. U.S. Pat. Nos. 2,403,113 and 3,222,432 describe useful methods.

Additionally, there may be present mold release agents in the mixture of monomers. Typical mold release agents include silicones, silanes, and alkyl phosphates. Particularly preferred are alkyl phosphates such as DuPont ORTHOLEUM ® 162 mole release agent.

Typically, the monomers are polymerized in full, air tight molds because air retards polymerization. A free radical catalyst such as an organic peroxide or peroxy carbonate is dissolved in the monomer in a concentration of between about 0.1 and 10 weight percent, typically between about 2 and 5 weight percent, and the catalyzed monomer is heated to effect the desired degree of polymerization. Temperatures between about 30° C. and 120° C. and times between about 1 and 24 hours are generally employed. Heating may be at a constant temperature, at gradually increasing temperatures, or at stepwise increasing temperatures. Useful heat cycles for the polymerization of allyl diglycol carbonate are disclosed in Dial et al, Polymerization Control in Casting a Thermosetting Resin, *Industrial and Engineering Chemistry*, Vol. 49, page 2447 (Dec., 1955).

When in the green-colored state, the light absorbing polymerizates of this invention have low transmittance in the near infrared region from about 700 to about 2,000 nanometers and in the visible region from about 300 to about 700 nanometers.

The following examples illustrate how the present invention may be practiced. Although the examples describe polymerizates of diethylene glycol bis(allyl carbonate) and maleic acid anhydride, the methods described may be practiced with the use of the other allyl carbonate monomers and olefinically unsaturated carboxylic acid monomers, as well as mixtures thereof with third monomers.

EXAMPLE I

Two diethylene glycol bis(allyl carbonate)-maleic acid ahydride copolymer sheets containing 0.50 and 0.25 weight percent tungsten hexacarbonyl were prepared and tested for light transmissivity.

A 5 weight percent composition of tungsten hexacarbonyl, $W(CO)_6$, in maleic acid anhydride,

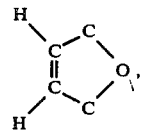

was prepared. This composition was maintained at 95° C. for 16 hours, forming a clear, dark blue-green solution with a slight precipitate. The solution was then heated to about 150° C. for about 30 minutes until the precipitate disappeared.

The liquid composition of maleic acid anhydride-tungsten hexacarbonyl was divided into two portions and added to diethylene glycol bis (allyl carbonate). One solution contained 10 weight percent maleic acid anhydride-tungsten hexacarbonyl and 90 weight percent diethylene glycol bis(allyl carbonate), thereby providing a liquid composition containing about 0.5 weight percent tungsten hexacarbonyl. The other solution contained 5 weight percent maleic acid anhydride-tungsten hexacarbonyl, thereby providing a liquid composition containing about 0.25 weight percent tungsten hexacarbonyl. Sufficient isopropyl peroxy dicarbonate initiator was added to both solutions to provide a total initiator content of 3.5 weight percent, basis total monomers, additives, and initiator.

The two solutions were then poured into 4 inch by 7 inch by 0.25 inch glass molds, formed of two sheets of glass separated by a 0.25 inch thick gasket. Upon heating of the molds, both liquids changed color from blue to green. The two molds were heated according to the following temperature sequence:

| Cure Cycle | |
|---|---|
| Elapsed Time (hours) | Temperature °C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

During curing, both samples changed color from green to near water-white. After curing, both samples were removed from the molds.

The samples were then tested for percent transmission of 550 nanometer wave length green light by a sequence of exposure to a Fadeometer ® carbon arc lamp followed by measurement of transmission during exposure and after dark storage. The following results were obtained:

| Percent Transmission of 550 Nanometer Light | | |
|---|---|---|
| Preparation of sample | | |
| Weight percent maleic anhydride in original liquid composition | 10% | 5% |
| Weight percent tungsten hexacarbonyl in original liquid composition | 0.5% | 0.25% |
| Light transmission during exposure to Fadeometer ® | | |
| 0 minutes | 72 | 84 |
| 30 minutes | 32 | 57 |
| 60 minutes | 26 | 51 |
| Light transmission after exposure to Fadeometer ® and storage in dark for the time shown | | |
| 16 hours | 28 | 54 |
| 4 days | 30 | 57 |
| 8 days | 31 | 58 |
| 12 days | 34 | 60.5 |
| 14 days | 34 | 62 |
| 27 days | 39 | 65 |
| 40 days | 41 | 67 |

EXAMPLE II

A series of tests were conducted to determine the effect of the method of incorporation of the tungsten hexacarbonyl into the diethylene glycol bis(allyl carbonate)-maleic anhydride copolymer.

Two solutions of tungsten hexacarbonyl in monomer were prepared. One solution contained 0.04 grams of tungsten in 40 grams of diglycol bis (allyl carbonate).

The second solution contained 1.25 grams of tungsten hexacarbonyl in 25 grams of maleic anhydride. Both solutions were heated at 95° C. for 16 hours. All of the tungsten hexacarbonyl in the first solution dissolved. The second solution was then heated to 155° C. for about 5 minutes and all of the tungsten hexacarbonyl dissolved.

The solutions were then mixed, as shown in the table below, sufficient isopropyl peroxy dicarbonate initiator was added to each solution to provide a total initiator content of 3.5 weight percent, basis total monomer, additive, and initiator, and poured into 4 inch by 7 inch by 0.25 inch molds formed of two sheets of glass separated by a 0.125 inch thick gasket. The molds were then heated according to the following temperature sequence:

| Cure Cycle | |
|---|---|
| Elapsed Time (hours) | Temperature °C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

The samples were then tested for percent transmission of 550 nanometer wave length green light after exposure to a Fadeometer ® carbon arc lamp with measurement of transmission during exposure and after dark storage. The following results were obtained:

| Percent Transmission of 550 Nanometer Light | | | |
|---|---|---|---|
| Preparation of solutions | | | |
| Grams of solution of 0.04 grams tungsten hexacarbonyl, 40 grams of diethylene glycol bis(allyl carbonate) | 20 | 20 | 0 |
| Grams of solution of 1.25 grams of tungsten hexacarbonyl, 25 grams of maleic acid anhydride | — | 2 | 2 |
| Grams of diethylene glycol bis(allyl carbonate) without additive | — | — | 20 |
| Composition of materials in molds | | | |
| Diglycol bis(allyl carbonate), grams | 20 | 20 | 20 |
| Maleic anhydride, grams | — | 2 | 2 |
| Tungsten hexacarbonyl, grams | 0.02 | 0.12 | 0.1 |
| Light transmission during exposure to Fadeometer® carbon arc lamp | | | |
| 0 minutes | 89 | 35 | 35 |
| 30 minutes | 66 | 10 | 10 |
| 60 minutes | 59 | 6 | 6 |
| Light transmission after exposure to Fadeometer® carbon arc lamp and dark storage for indicated time | | | |
| 2 days | 62 | 8 | 7 |
| 8 days | 63 | 10 | 9 |
| 21 days | 75 | 13 | 12 |
| 34 days | 79 | 15 | 14 |

EXAMPLE III

A series of tests were conducted to determine the effect of the preparation of the tungsten hexacarbonyl-maleic acid anhydride on the final maleic acid anhydride-diethylene glycol bis(allyl carbonate) copolymer.

A 5 weight percent solution of tungsten hexacarbonyl in maleic anhydride was prepared. The solution was heated over one hour to 150° C. and maintained thereat with continuous stirring and total reflux in a Erlenmeyer Flask. Samples were then taken periodically, as shown in the table, added to diglycol bis(allyl carbonate), initiated with 3.5 weight percent isopropyl peroxydicarbonate initiator, and placed in a 4 inch by 7 inch by 0.25 inch glass mold. The mold was then heated according to the following temperature sequence:

| Cure Cycle | |
|---|---|
| Elapsed Time (hours) | Temperature °C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

The results shown below were obtained:

| Appearance of Solution and Castings | | | |
|---|---|---|---|
| Elapsed Time Since Heating Commenced | Time at 150° C. | Solution | Casting |
| 2 | 1 | blue | green-gray |
| 3 | 2 | dark blue | light blue-gray |
| 4 | 3 | dark blue | blue-gray |
| 5 | 4 | dark blue with precipitate | blue-gray (hazy) |
| 6 | 5 | dark blue with precipitate | blue-gray (hazy) |

EXAMPLE IV

A green casting was formed by copolymerizing ethylene diglycol bis(allyl carbonate) and maleic acid anhydride in the presence of tungsten hexacarbonyl and IRGASET yellow.

A 5 weight percent solution of tungsten hexacarbonyl in maleic anhydride was prepared. This solution was heated over a period of one hour to 150° C. and maintained at 150° C. for 5 hours in an Erlenmeyer Flask with continuous stirring and total reflux.

EXAMPLE VI

A lens was prepared by copolymerizing ethylene diglycol bis (allyl carbonate) and maleic acid anhydride in the presence of tungsten hexacarbonyl and DuPont Ortholeum ® 162 alkyl phosphate mold release agent.

A 5 weight percent solution of tungsten hexacarbonyl in maleic acid anhydride was prepared by adding 0.5 gram of tungsten hexacarbonyl to 10.0 grams of maleic acid anhydride. This solution was heated to 150° C. for three hours with total reflux. The resulting deep blue solution was then added to 90.0 grams of diethylene glycol bis(allyl carbonate). Thereafter, 0.075 gram of DuPont Ortholeum ® 162 alkyl phosphate mold release agent was added to the composition. The composition was then cooled to room temperature, about 20 grams of silica gel was added to dry the composition. The composition was stirred for 20 minutes and then filtered through No. 40 paper.

The filtrate was allowed to stand under vacuum for 15 minutes. Sufficient isopropyl peroxydicarbonate was added to provide an initiator content of 4 weight percent. The composition was then divided into four portions and placed into four lens molds.

The four portions were heated to 37° C. for 1½ hours and thereafter cured according to the following cycle:

| Cure Cycle | |
|---|---|
| Elapsed Time (hours) | Temperature, °C. |
| 1½ | 42 |
| 3½ | 44 |
| 5½ | 45 |
| 7½ | 46 |
| 9½ | 47 |
| 11½ | 48 |
| 13½ | 50 |
| 15½ | 52 |
| 17½ | 54.5 |
| 19½ | 57 |
| 21½ | 61 |
| 23½ | 69 |
| 24½ | 79 |
| 25½ | 98 |
| 25.6 | 100 |

Four blue lenses were produced.

EXAMPLE VII

A lens was prepared by copolymerizing ethylene diglycol bis (allyl carbonate) and maleic acid anhydride in the presence of tungsten hexacarbonyl, IRGASET yellow and DuPont Ortholeum ® 162 alkyl phosphate mold release agent.

A 5 weight percent solution of tungsten hexacarbonyl in maleic acid anhydride was prepared by adding 1.0 grams of tungsten hexacarbonyl to 20.0 grams of maleic acid anhydride. This solution was heated to 150° C. for three hours with total reflux resulting in a deep blue solution.

CIBA-Geigy IRGASET yellow (0.007 gram) and 0.075 gram of DuPont Ortholeum ® 162 alkyl phosphate mold release agent were added to 90.0 grams of diethylene glycol bis(allyl carbonate). Ten grams of the 5 weight tungsten hexacarbonyl-maleic acid anhydride was then added to the diglycol bis(allyl carbonate). The composition was then cooled to room temperature and about 20 grams of silica gel was added to dry the composition. The composition was stirred for 20 minutes and then filtered through No. 40 paper.

The filtrate was allowed to stand under vacuum for 15 minutes. Sufficient isopropyl peroxydicarbonate was added to provide an initiator content of 4 weight percent. The composition was then divided into four portions and placed into four lens molds.

The four portions were heated to 37° C. for two hours and thereafter cured according to the following cycle:

| Cure Cycle | |
|---|---|
| Elapsed Time (hours) | Temperature, °C. |
| 2 | 42 |
| 4 | 44 |
| 6 | 45 |
| 8 | 46 |
| 10 | 47 |
| 12 | 48 |
| 14 | 50 |
| 16 | 52 |
| 18 | 54.5 |
| 20 | 57 |
| 22 | 61 |
| 24 | 69 |
| 25 | 79 |
| 26 | 98 |
| 26.1 | 100 |

Four green lenses were produced.

Although this invention has been described in terms of specific details and embodiments, the description is not intended to limit the invention, the scope of which is defined in the following claims.

I claim:

1. A light absorbing liquid composition provided by heating a liquid composition consisting essentially of an olefinically unsaturated carboxylic acid and a light absorbing quantity of tungsten hexacarbonyl.

2. The liquid composition of claim 1 wherein the olefinically unsaturated acid is chosen from the group consisting of maleic acid, maleic acid anhydride, and acrylic acid.

3. A polymerizate of an olefinically unsaturated carboxylic acid and a bis(allyl carbonate) containing a light absorbing component provided by the reaction of the olefinically unsaturated carboxylic acid in the presence of about 0.1 to about 3 weight percent tungsten hexacarbonyl basis total organics.

4. The polymerizate of claim 3 wherein the bis(allyl carbonate) is represented by the formula:

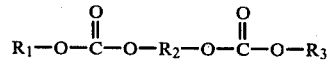

where $R_1$ and $R_3$ are allyl groups represented by the formula:

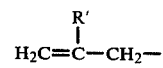

where R' is chosen from the group consisting of H, a halogen, and a 1 to 4 carbon alkyl group, and $R_2$ is a radical derived from the glycol used to make the bis(allyl carbonate) monomer.

5. The polymerizate of claim 4 wherein the bis(allyl carbonate) is diethylene glycol bis(allyl carbonate).

6. The polymerizate of claim 3 wherein the olefinically unsaturated carboxylic acid is represented by the formula:

One part of the above maleic anhydride-tungsten hexacarbonyl solution was mixed with four parts of ethylene diglycol bis(allyl carbonate). Sufficient CIBA-Geigy IRGASET yellow dye was added to provide 0.007 weight percent dye and sufficient dioctyl phthalate release agent was added to provide 100 parts per million release agent. The reaction mixture, containing sufficient isopropyl peroxydicarbonate to provide a 3.5 weight percent initiator was then placed in a mold and cured according to the following cycle:

| Cure Cycle | |
|---|---|
| Elapsed Time (hours) | Temperature °C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

The resulting casting had a deep green color. After exposure to a Fadeometer ® carbon arc for 55 minutes, it had 550 nanometer green light transmission of only 15 percent.

The casting was then analyzed on a Cary Spectrophotometer and exhibited the following transmission characteristics:

| Wavelength (NM) | % Transmission |
|---|---|
| 350 | 4 |
| 400 | 16 |
| 500 | 18 |
| 550 | 15 |
| 600 | 13 |
| 700 | 6 |
| 800 | 3 |
| 900 | 2 |
| 1000 | 2 |
| 1100 | 2 |
| 1200 | 6 |
| 1300 | 6 |
| 1400 | 10 |
| 1500 | 19 |
| 1600 | 24 |
| 1650 | 25 |
| 1700 | 13 |
| 1800 | 24 |
| 1875 | 31 |
| 1900 | 24 |
| 2000 | 40 |
| 2100 | 26 |

EXAMPLE V

A series of tests were conducted to determine the effect of lubricants and release agents on copolymers of maleic acid anhydridediethylene glycol bis(allyl carbonate).

A reaction mixture of 7.5 weight percent maleic acid anhydride, 0.42 weight percent tungsten hexacarbonyl, 4.2 weight percent isopropyl peroxydicarbonate and balance ethylene diglycol bis(allyl carbonate) was prepared. This was divided into eight samples. The mold release agents were added in the amount shown below. The samples were then cured according to the following time temperature sequence:

| Cure Cycle | |
|---|---|
| Elapsed Time (hours) | Temperature °C. |
| 0 | 42 |
| 2 | 44 |
| 4 | 45 |
| 6 | 46 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 24 | 98 |
| 24.1 | 100 |

Thereafter the castings were exposed to a Fadeometer ® carbon arc lamp for one hour and the 550 nanometer transmissions shown in the table were obtained. The castings were also tested for initial and 15 second Barcol hardness readings and the values shown in the table were obtained.

| Effect of Release Agent on Properties | | | | | | | |
|---|---|---|---|---|---|---|---|
| Release Agent | | Barcol | Percent Transmission | | | | Release |
| Name | Concentration | Hardness | 1 day | 3 days | 12 days | Appearance | (qualitative) |
| DOP | 100 ppm | 31–26 | 12 | 14 | 17 | Light blue-green | Difficult |
|  | 1000 ppm | 29–24 | 11 | 14 | 17 | Light blue-green | Medium |
| Ortholeum ® 162 | 100 ppm | 32–27 | 11 | 13 | 16 | Light blue-green | Fair |
|  | 1000 ppm | 31–26 | 7 | 7 | 8 | Blue | Easy |
| Ortholeum ® 535 | 100 ppm | 32–27 | 11 | 13 | 16 | Light blue-green | Easy |
|  | 1000 ppm | 34–29 | 11 | 13 | 15 | Light blue | Pre-released |
| Silane 174 | 100 ppm | 30–26 | 13 | 16 | 20 | Green-brown | Medium |
|  | 1000 ppm | 30–24 | 20 | 22 | 26 | Brown | Difficult |

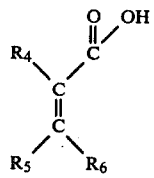

where $R_4$, $R_5$, and $R_6$ are chosen from the group consisting of hydrogen, halogen, and alkyl groups of 1 to 4 carbon atoms and where either $R_5$ or $R_6$ may be a carboxylic acid group.

7. The polymerizate of claim 6 wherein the olefinically unsaturated acid is chosen from the group consisting of acrylic acid, maleic acid, and maleic acid anhydride.

8. The polymerizate of claim 3 comprising from about 0.10 to about 3 weight percent tungsten, calculated as tungsten hexacarbonyl, basis total organics, up to about 25 weight percent acid, and balance bis(allyl carbonate).

9. A method of preparing a light absorbing polymerizate comprising:
heating a liquid, olefinically unsaturated carboxylic acid in the presence of about 0.1 to about 3 weight percent of tungsten hexacarbonyl, basis total organics in the polymerizate, to form a light absorbing liquid;
adding the light absorbing liquid to a bis(allyl carbonate) and
polymerizing the light absorbing liquid and the bis(allyl carbonate).

10. The method of claim 9 wherein the bis(allyl carbonate) is represented by the formula:

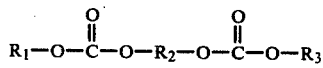

where $R_1$ and $R_3$ are allyl groups represented by the formula:

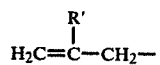

where $R'$ is chosen from the group consisting of H, a halogen, and a 1 to 4 carbon alkyl group, and $R_2$ is a radical derived from the glycol used to make the bis(allyl carbonate) monomer.

11. The method of claim 10 wherein the bis(allyl carbonate) is diethylene glycol bis(allyl carbonate).

12. The method of claim 9 wherein the olefinically unsaturated carboxylic acid is represented by the formula:

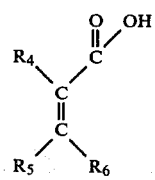

where $R_4$, $R_5$, and $R_6$ are chosen from the group consisting of hydrogen, halogen, and alkyl groups of 1 to 4 carbon atoms and where either $R_5$ or $R_6$ may be a carboxylic acid group.

13. The method of claim 12 wherein the olefinically unsaturated acid is chosen from the group consisting of acrylic acid, maleic acid, and maleic acid anhydride.

14. A light absorbing polymerizate of a bis(allyl carbonate) and a light absorbing component provided by the reaction product of tungsten hexacarbonyl and an olefinically unsaturated carboxylic acid.

15. The polymerizate of claim 14 wherein the bis(allyl carbonate) is represented by the formula:

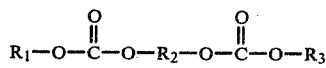

where $R_1$ and $R_3$ are allyl groups represented by the formula:

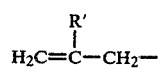

where $R'$ is chosen from the group consisting of H, a halogen, and a 1 to 4 carbon alkyl group; and $R_2$ is a radical derived from the glycol used to make the bis(allyl carbonate) monomer.

16. The polymerizate of claim 14 wherein the bis(allyl carbonate) is diethylene glycol bis(allyl carbonate).

17. The polymerizate of claim 14 wherein the olefinically unsaturated carboxylic acid is represented by the formula:

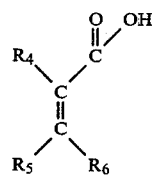

where $R_4$, $R_5$, and $R_6$ are chosen from the group consisting of hydrogen, halogen, and alkyl groups of 1 to 4 carbon atoms and where either $R_5$ or $R_6$ may be a carboxylic acid group.

18. The polymerizate of claim 17 wherein the olefinically unsaturated acid is chosen from the group consisting of acrylic acid, maleic acid, and maleic acid anhydride.

19. The polymerizate of claim 14 comprising from about 0.10 to about 3 weight percent tungsten, calculated as tungsten (hexacarbonyl), basis total organics, up to about 25 weight percent acid, and balance bis(allyl carbonate).

20. A method of preparing a light absorbing polymerizate comprising:
heating a liquid, olefinically unsaturated carboxylic acid in the presence of a light absorbing amount of tungsten hexacarbonyl to form a light absorbing liquid;
adding the light absorbing liquid to a bis(allyl carbonate) and
polymerizing the light absorbing liquid and the bis(allyl carbonate).

21. The method of claim 20 wherein the bis(allyl carbonate) is represented by the formula:

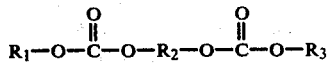

where $R_1$ and $R_3$ are allyl groups represented by the formula:

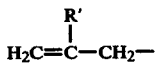

where $R'$ is chosen from the group consisting of H, a halogen, and a 1 to 4 carbon alkyl group, and $R_2$ is a radical derived from the glycol used to make the bis(allyl carbonate) monomer.

22. The method of claim 21 wherein the bis(allyl carbonate) is diethylene glycol bis(allyl carbonate).

23. The method of claim 20 wherein the olefinically unsaturated carboxylic acid is represented by the formula:

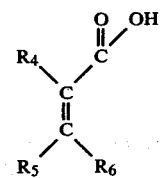

where $R_4$, $R_5$, and $R_6$ are chosen from the group consisting of hydrogen, halogen, and alkyl groups of 1 to 4 carbon atoms and where either $R_5$ or $R_6$ may be a carboxylic acid group.

24. The method of claim 23 wherein the olefinically unsaturated acid is chosen from the group consisting of acrylic acid, maleic acid, and maleic acid anhydride.

* * * * *